Figure 1:
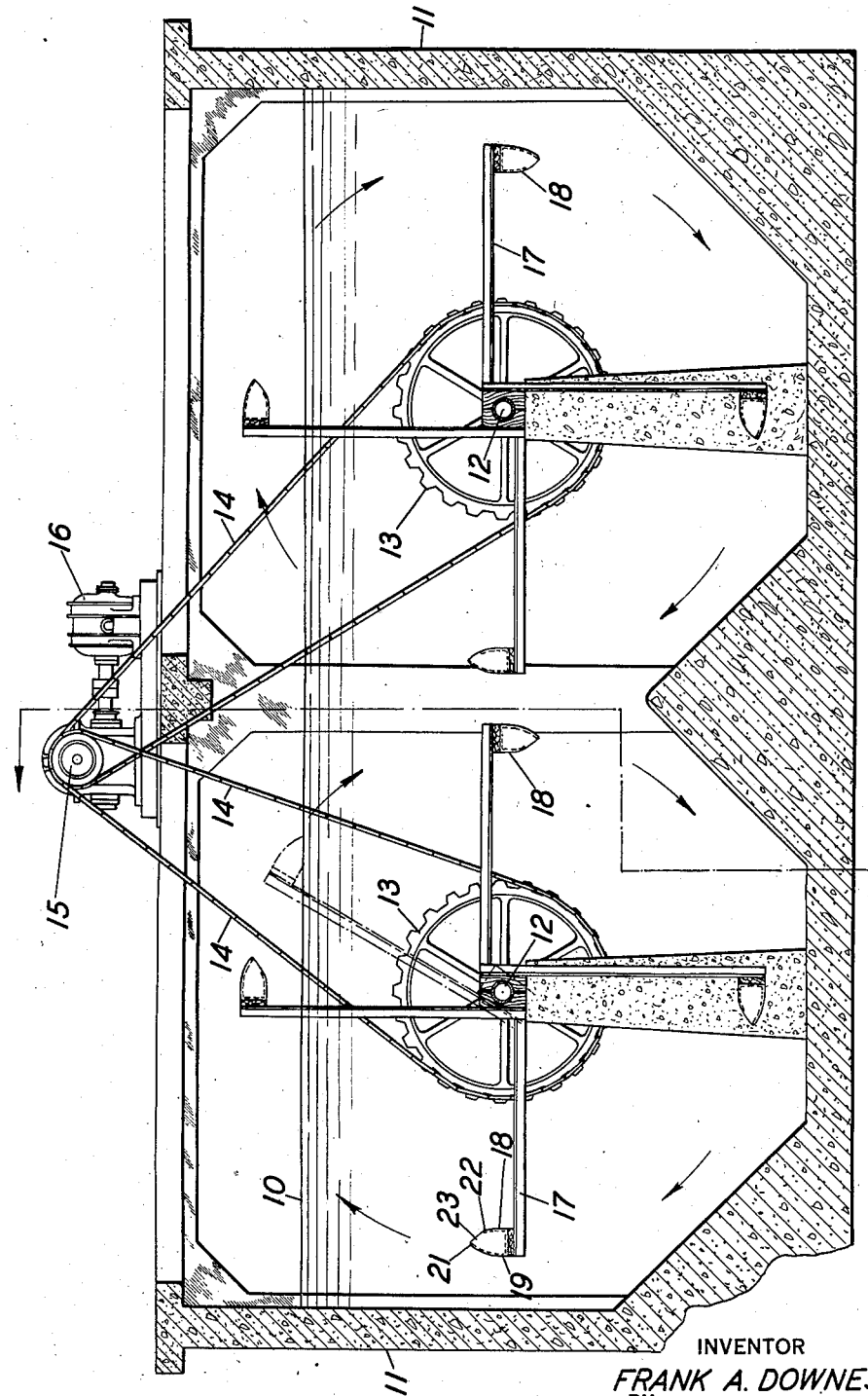

Dec. 25, 1934.　　　F. A. DOWNES　　　1,985,854
SEWAGE AERATOR
Filed Nov. 21, 1931　　　4 Sheets-Sheet 1

INVENTOR
FRANK A. DOWNES
BY
ATTORNEY

Dec. 25, 1934.  F. A. DOWNES  1,985,854
SEWAGE AERATOR
Filed Nov. 21, 1931   4 Sheets-Sheet 3

INVENTOR
FRANK A. DOWNES
BY
ATTORNEY

Dec. 25, 1934.  F. A. DOWNES  1,985,854
SEWAGE AERATOR
Filed Nov. 21, 1931    4 Sheets-Sheet 4
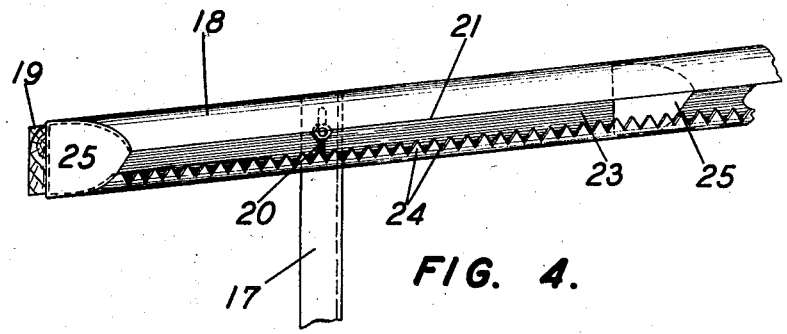
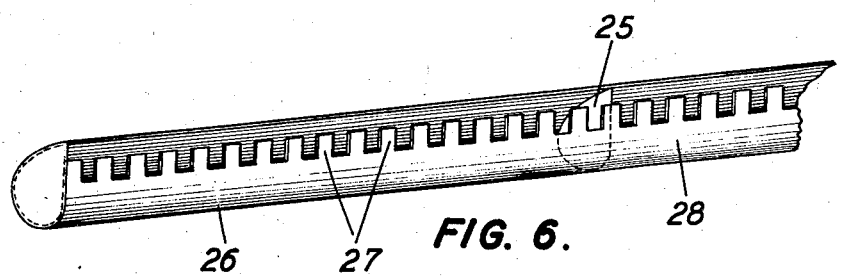
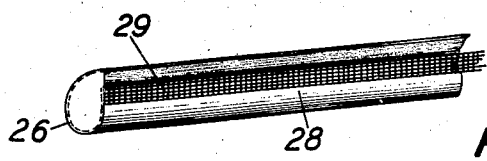
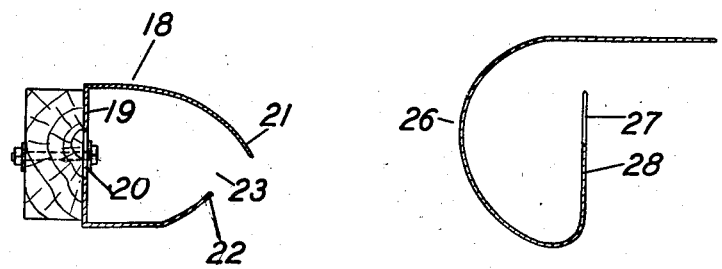
FRANK A. DOWNES
INVENTOR
BY Austin Middleton
ATTORNEY Patented Dec. 25, 1934

1,985,854

UNITED STATES PATENT OFFICE 1,985,854

SEWAGE AERATOR

Frank A. Downes, Larchmont, N. Y., assignor to The Dorr Company, Inc., New York, N. Y., a corporation of Delaware Application November 21, 1931, Serial No. 576,540

4 Claims. (Cl. 210—8)

This invention relates to the aeration of sewage sludge to activate it.

Heretofore sewage sludge has been activated in aerating tanks or channels wherein compressed air was permitted to bubble up through the sludge in sufficient quantities whereby at the same time, the sludge was being rotated to diffuse the air in the sewage. A motor driven compressor was required and so the operating cost of the present methods of aeration is fairly expensive. The installation cost of such aeration equipment is likewise expensive because the tank has to be provided with a system of air pipes and porous tiles through which the air is emitted into the liquid in the tank.

The object of this invention is to reduce both installation and operating costs by eliminating all use of compressed air. That is to say, the object is to introduce air into the sewage liquid in sufficient quantities and to diffuse that air sufficiently to bring about sludge activation by means of air-trapping and diffusing mechanisms rotating in the sewage-containing tank.

To that end, the invention may be said to comprise arms rotating paddle-like in the aerating tank and provided with air-scoop means adapted for alternate submergence and emergence with respect to the sewage liquid so arranged that air trapped in each scoop during emergence of the scoop is thereby carried down into the sewage sludge and diffused therein, as the arms are rotated. The invention further consists in a particular type of air-scoop means wherein air will be trapped when in their above-liquid or zenith position and wherein the trapped air will be released below the liquid level as the scoops or cups are rotated. This arrangement, if rotated at a proper speed, provides sufficient velocity to the sewage to maintain the flocs therein in suspension; gives surface contact of sewage and air due to a surface rippling effect; and the air trapped in the scoops is delivered below the surface of this liquid so that a bubbling up of the air is obtained in the same way as in the diffused air method of aeration.

More particularly the invention resides in the shape or formation of the scoops or cups so that air trapped therein is released over the nadir part of travel of the cups. Other desirable characteristics of the scoops are that they must discharge substantially all water therefrom quickly after their emergence from the liquid; that they set up a rippling or wave action at the liquid surface as submergence and emergence takes place; that they suck air down into the liquid as they submerge; and that, they produce splash aeration as liquid empties from the cups before they submerge again. And the invention also includes the feature of rotating the cups at a substantially critical speed.

Therefore, the scoop means of this invention have been devised to meet all of these requirements while at the same time offering as little resistance as possible in passing through the liquid so that the power consumption in rotating them is kept down to a minimum.

While my invention is capable of many uses and I wish to avail myself of all of them, I have developed the invention with especial reference to the aeration or activation of sewage material and accordingly I shall describe that embodiment thereof for the purpose of making the invention manifest.

For a better understanding of the invention reference should be had to the accompanying drawings wherein one embodiment of the invention is shown for illustrative purposes.

Figure 2:
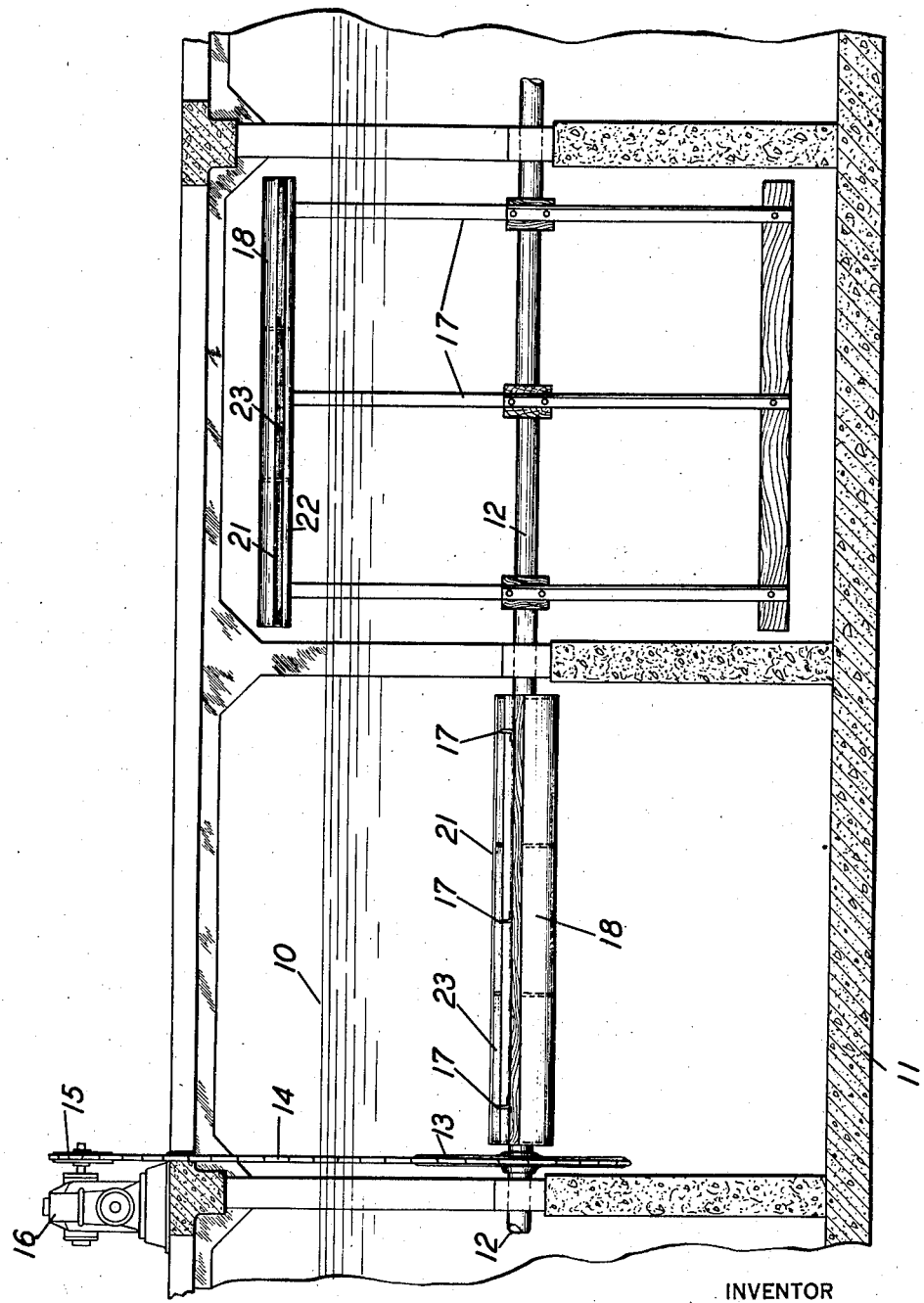
Figure 3:
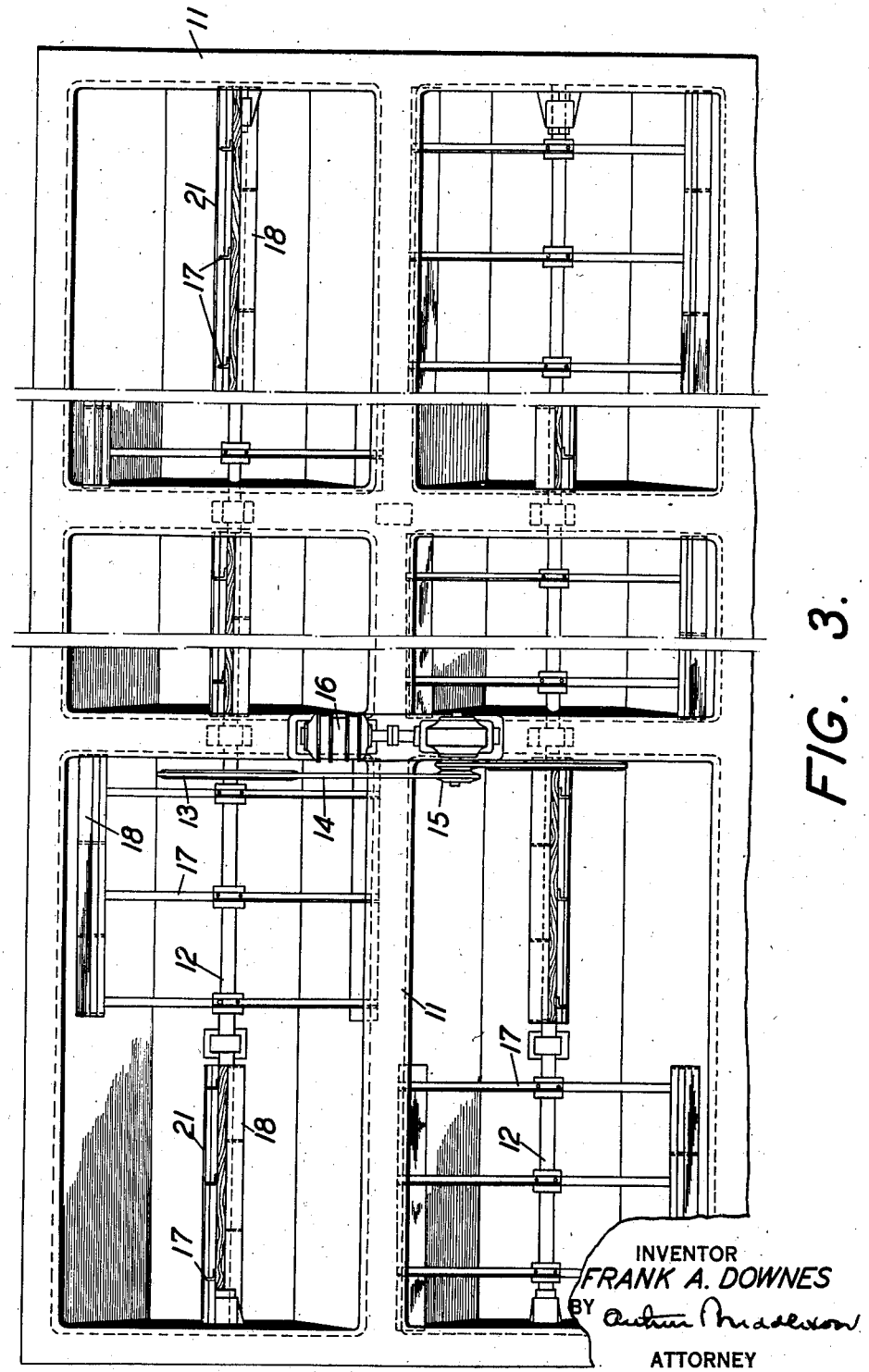

In the drawings Figure 1 shows a vertical transverse sectional view through an aerating tank with the scoop aerators of this invention in place. Fig. 2 shows a vertical longitudinal sectional view of the tank and aerators taken along the line 2—2 in Fig. 1. Fig. 3 shows a plan view of such a tank. Fig. 4 shows a perspective view of my preferred form of cup or scoop while Fig. 5 shows a transverse sectional view thereof. Fig. 6 shows a perspective view of a modified form of cup while Fig. 7 shows a transverse sectional view thereof. Fig. 8 shows a further modification.

Sewage material or sludge 10 to be activated or aerated is flowed into the aeration tank 11 provided with a horizontal shaft 12 suitably rotated for instance by means of a sprocket or pulley 13 and chain or belt 14 taking around another sprocket or pulley 15 which latter is suitably motivated by a motor 16. Arms, preferably radial or other supports 17 are provided on the shaft 12, adapted to carry air-scoops or cups 18. Rotation of the shaft with its arms carry the cups 18 alternately to submergence and emergence with respect to the sewage material 10 in the tank, for the length of the arms 17 is such that when in their zenith position, their cups are centered approximately nine inches above the liquid level in the tank (for a reason given hereinafter).

The cups of this invention are adapted to trap air in their zenith position, carry it down into the liquid as the cups are submerged, and then release the trapped air progressively or gradually during their submergence so that the air is thus diffused in the liquid. It is preferred that air release shall not take place until substantially nadir position is reached by each cup to get the maximum diffusion of the air into the liquid. As the trapped air is released, it is displaced with liquid, so upon emergence of the cup it is necessary that the water therein be expelled quickly. So that water-discharge and then air entrapment shall be complete, the interval of emergence must be long enough so it is to that end that the cups when in zenith position are located substantially nine inches above liquid level. Thus it can be seen that considerable importance attaches to the shape, particularly the cross-sectional shape, of my cups or air-scoops.

The cups shown in Figs. 1 and 2 have a substantially flat back 19 which may be adjustably secured to its carrying arms 17, such as by a slotted and pin connection 20 whereby the cup may be levelled and also may be adjusted so that when in its zenith position it will be the proper distance from the liquid level. Considering the cup 18 in its zenith position, it has an upper downwardly curved hood-like top or lip 21, while its lower lip or bottom 22 is similarly but reversely or upwardly curved, and the top portion is longer and overhangs the lower portion forming a mouth 23. The curves on the top and bottom of the cup 18 are devised to make the contour of the cup streamline to offer a minimum of resistance as they pass through the liquid. The respective lengths of the top and bottom lips and their relative positioning is such that when the cup is rotated from its zenith position the edges of the top and bottom lips of the cup strike the liquid simultaneously at the instant of submergence whereby the air in the cup is trapped therein. As the cup continues its submergence, waves or ripples are set up on the surface of the liquid which helps in the oxidation of that part of the liquid. As submergence of the cup becomes total and then further progresses as to depth, the substantially flat back 19 of the cup creates a suction behind the cup causing air to be sucked down behind the cup as it progresses along its path. This sucked-down air is also useful in aiding proper aeration of the liquid because it is quickly broken up into small bubbles which facilitates the absorption of that air by the liquid.

It is desired that the air trapped in the submerged cup shall be emitted therefrom gradually or constantly, and in the form of fine bubbles. I have found that under certain circumstances this result is obtained if the lower lip 22 of the cup be non-continuous as at 24. Crenelations seem preferable, altho under some conditions serrations may be sufficient to produce the results desired. These serrations or crenelations are also useful in aiding the quick release from the cup, upon emergence thereof from the liquid, of its water which during submergence gradually displaced the air trapped in the cup at the instant of its submergence. If the water is not entirely removed from the cup prior to its resubmergence, the volume of air which can be trapped in the cup is lessened to the extent of whatever volume of water may remain in the cup. Therefore the crenelations serve a double purpose and accordingly I do not want to limit myself to their precise shape for I may find teeth of varying shapes also useful to obtain the same effect of giving good distribution of air across the lengths of the cups. I have also found that the cups should not be too long or else the entrapped air has a tendency to escape end- or sideways. So, I prefer cups two or three feet long but if a long cup is desirable for constructional reasons, the long cups can be blocked off with partitions 25 so that each cup or cup section is not too long to let air escape therefrom sideways.

In Figs. 6 and 7, a modified form of cup 26 is shown in which the cup is substantially involutely curved in transverse cross section. It can be seen that this shape of cup meets many of the requirements specified herein, and it is slightly cheaper to make. It may be provided at 27 with a serrated or toothed lip as described for the cup 18. This cup is also provided with an adjustable or slot-and-pin connection with the radial arms which carry it so that the angle of the discharge- or lower-lip 28 can be controlled to retard the air release from the cup and thereby to give the best air distribution across the tank.

Fig. 8 shows a further modification in the manner of constructing the aerating cup. It is so important to have the air which is conveyed into the liquid in the form of bubbles which are small that instead of the serrations 24 on the lower lip of the cup as shown in Fig. 4 or instead of crenelations 27 on the lower lip of the cup, there may be used a wire screen or wire cloth 29 on the lower lip 28 of the cup. This wire screen or wire cloth tends to break up the air bubbles in the liquid to make them small, which effect is much desired. Naturally the invention is not limited to any specific form of terminating edge for the lip of the aerating cups so long as the result is obtained of breaking up the air bubbles.

Next comes the matter of speed. Present day mechanical sewage aerators now on the market depend upon surface absorption of atmospheric oxygen for their result. Experience has shown that the introduction of compressed air into the sewage sludge is better than surface aeration altho only about 5% of this air is actually utilized for oxidation purposes, the rest being used for agitative or rotative purposes to help prevent sedimentation. With the aerating cups or air-scoops of this invention, it therefore becomes necessary to rotate them at a speed which will give the sludge liquid sufficient velocity to maintain its flocs in suspension; while at the same time insufficient to break up the flocs and, which will supply and disseminate enough air throughout the sewage liquid to aerate it and cause activation. To this end, I have found that a cup speed of 3.90 feet per second is best. Up to 2.75 feet per second the surface tension of the liquid is such as to cause erratic air distribution and the air bubbles released vary greatly in size. After a speed of 3.14 feet per second is reached, an improvement is noticed in their smaller size of bubbles emitted, their more uniform size, and their better distribution for they seem to be swept farther across the tank. At 4.00 feet per second the best results appear to be obtained and at that speed, the bubbles formed were held in suspension for the longest time. Accordingly, I believe the critical cup speed lies above 2.75 feet per second and between 3.14 and 4.00 feet per second, for above this speed agitation and aeration tend toward violence while below it aeration is insufficient and poorly effective.

In starting up the operation of the hereindescribed embodiment of this invention initially, adjustments are made so that the cups in their zenith position are substantially nine inches above liquid level; so that the cups are level whereby all points in the edges of their lips strike the liquid substantially simultaneously; (see dotted line position in Fig. 1) and so that the cups will have a proper velocity. Hereafter, rotation of the cups causes the zenith position cup to have air trapped therein as it submerges; to have air released therefrom constantly during its rotational progress during submergence past its nadir position, with the air in small uniform sized bubbles thus well distributed; to have the water picked up by the cup discharged therefrom quickly upon emergence of the cup; so that this water discharge causes aerating splashes on the surface of the sewage liquid; so that the submergence and emergence of the cup sets up waves or ripples on the surface of the liquid in the tank; and so that the liquid in the tank is agitated to keep its flocs in suspension.

This invention therefore, offers a means for aerating sewage material whereby all use of compressed air is rendered unnecessary, and a means whereby the operating costs over similar devices now in use is reduced 50%. The invention may have other uses and it is not intended that anything stated herein shall restrict this invention from including those uses. Similarly it is obvious that other embodiments of the invention are possible and equivalent elements may be substituted for parts of the present embodiment but it is intended that these shall come within the spirit and scope of this invention.

I claim:

1. In a sewage aerator comprising a tank for sewage material to be aerated, and rotatable arms moving about a horizontal axis through the sewage, air trapping scoops associated with said arms in order to periodically pass through the sewage by the rotation, each scoop having two opposed lips an outer and an inner one relative to the axis of rotation to form the mouth of said scoop, and means arranged along the inner lip and effective to distribute and subdivide the air discharge along the lip when releasing the trapped air into the sewage.

2. In a sewage aerator comprising a tank for sewage material to be aerated, and rotatable arms moving about a horizontal axis through the sewage, air trapping scoops associated with said arms in order to periodically pass through the sewage by the rotation, each scoop having two opposed lips an outer and an inner one relative to the axis of rotation to form the mouth of said scoop, the inner lips having a crenelated edge effective to distribute subdivided air bubbles into the sewage.

3. In a sewage aerator comprising a tank for sewage material to be aerated, and rotatable arms moving about a horizontal axis through the sewage, air trapping scoops associated with said arms in order to periodically pass through the sewage by the rotation, each scoop having two opposed lips an outer and an inner one relative to the axis of rotation, to form the mouth of said scoop, both lips curved toward each other in a manner to give the scoop a forwardly pointed and rearwardly widened substantially streamlined cross sectional configuration.

4. In a sewage aerator comprising a tank for sewage material to be aerated, and rotatable arms moving about a horizontal axis through the sewage, horizontally elongated air trapping scoops associated with said arms and periodically submerged in the sewage by the rotation, each scoop effective to release air from the elongated mouth thereof for aeration as the scoop follows a circular path through the sewage, each scoop also having two opposed lips an outer and an inner one relative to the axis of rotation to form the mouth of the scoop, means arranged along the inner lip and effective to subdivide the air discharge along the lip, and partitions to make separate scoop sections in each scoop to insure substantially even air distribution over the length of the scoop.

FRANK A. DOWNES.